United States Patent
Frankel et al.

(10) Patent No.: US 8,018,186 B2
(45) Date of Patent: Sep. 13, 2011

(54) METHOD AND APPARATUS OF FAN MOTOR BRAKE

(75) Inventors: Scott Frankel, Gilbert, AZ (US); Christopher Best, Phoenix, AZ (US)

(73) Assignee: Minebea Co., Ltd., Nagano (JP)

( * ) Notice: Subject to any disclaimer, the term of this patent is extended or adjusted under 35 U.S.C. 154(b) by 511 days.

(21) Appl. No.: 12/212,561

(22) Filed: Sep. 17, 2008

(65) Prior Publication Data

US 2010/0066279 A1  Mar. 18, 2010

(51) Int. Cl.
*H02P 6/00* (2006.01)

(52) U.S. Cl. ........... 318/400.29; 318/400.26; 388/907.2; 363/16

(58) Field of Classification Search .......... 318/400.26, 318/400.27, 400.28, 400.29; 388/907.2; 363/16, 17

See application file for complete search history.

(56) References Cited

U.S. PATENT DOCUMENTS

| 4,379,984 | A | * | 4/1983 | Muller | 318/400.29 |
|---|---|---|---|---|---|
| 5,349,275 | A | * | 9/1994 | Muller | 318/400.29 |
| 5,859,519 | A | * | 1/1999 | Archer | 318/801 |
| 6,307,338 | B1 | * | 10/2001 | Kuner et al. | 318/400.26 |
| 6,725,132 | B2 | | 4/2004 | Frankel et al. | |
| 2008/0272724 | A1 | * | 11/2008 | Hayashi | 318/430 |

* cited by examiner

*Primary Examiner* — Rina I Duda
(74) *Attorney, Agent, or Firm* — George B.F. Yee; Fountainhead Law Group PC

(57) ABSTRACT

An electronic system for controlling a fan motor includes a microcontroller and a drive circuit. The microcontroller draws power from a first voltage source and generates control signals for sending drive current to stator coils of a fan motor via the drive circuit. The electronic system further includes a second voltage source to provide the microcontroller with an amount of energy sufficient to operate for a short period of time when the voltage of the first voltage source drops below a predetermined level. The microcontroller is configured to detect when the voltage level of the first voltage source drops below a given level and generates control signals for the drive circuit to discharge energy in the stator coils of the fan motor to quickly stop operation of the fan motor within a short period of time.

24 Claims, 9 Drawing Sheets

```
1001    void voltage_check(){
1010            ADCON0 = 0x8D;        // A/D module enabled, channel 3 selected.
1020            DelayUs(20);          // Wait required A/D aquisition time.
1030            GODONE = 1;           // Start the A/D conversion.
1040            while(GODONE);        // wait for conversion to complete.
1050
1060            ADRES1 = ADRESH;
1070            ADRES1 = ADRES1 << 8;
1080            ADRES2 = ADRESL;
1090            ADRES2 = ADRES1 + ADRES2;
1100
1110            if(ADRES2 < 500){     //check to see if voltage has dropped
1120                while(1){
1130                    GIE = 0;                      //turn off GIE to prevent unwanted interrupts
1140                    ADON = 0;                     //turn off AD module to save power
1150                    PORTC = PORTC | 0x14;         //write to portc to turn on lower FETs
1160                    CCPR1L = 0;                              //turn off PWM
1170                    CCP1CON = 0x00;   //turn off PWM
1180
1190                }
1200            }
1210    }
```

FIG. 4

METHOD AND APPARATUS OF FAN MOTOR BRAKE

BACKGROUND OF THE INVENTION

The invention is directed to a method and apparatus for intelligently stopping a fan motor. Merely by way of example, the invention has been applied to techniques of using a microcontroller to control braking the fan motor whenever a main power supply is on or off. But it would be recognized that the invention has a much broader range of applicability.

In electronic systems, such as computer systems or telecommunication systems, cooling fans are widely used for maintaining system operational capabilities. Because of the complexity of these electronic systems, cooling fans not only need to perform the traditional function of providing cooling air, but also need to have some intelligence in order to provide a user with specialized control of the fan motors. A typical conventional modern fan motor is of a type known as a brushless DC motor. Such a motor includes, among other things, a stator coil coupled to a DC power supply for inductively driving a permanent magnetic rotor in accordance with a commutation signal.

Due to variations in the DC power supply which commonly occur during normal operation of a fan, the speed of the fan will vary. In extreme situations, the power supply may effectively be removed (e.g., failure in the power supply, disconnection of the power supply), resulting in a loss of power to the fan. The fan blades will continue to rotate due to inertia and the inductive energy that is stored in the stator coils. However, when power from the fan is removed intentionally, say for maintenance reasons, the maintenance person will have to wait for the fan blades to spin down before doing any work. For large cooling fans which operate at high speeds, the spin down can take long time.

BRIEF SUMMARY OF THE INVENTION

The invention is directed to a method and apparatus for intelligently and more quickly stopping a fan motor. Merely by way of example, the invention has been applied to techniques of using a microcontroller to control braking the fan motor whenever interruption of a main power supply to the fan occurs. But it would be recognized that the invention has a much broader range of applicability.

Disclosed embodiments of the present invention include a fan controller having a microprocessing unit (e.g., microprocessor circuit, microcontroller circuit, and so on) that controls drive circuitry. Commutation signals produced by the microprocessing unit are fed to the drive circuitry to control the current delivered to the stator coils of a motor. An energy storage device is connected to provide a certain amount of power to the microprocessing unit, in the event of loss of power, to operate the microprocessing unit for a short period of time. The energy storage device stores at least enough energy to allow the microprocessing unit to control the drive circuit to ground the stator coils thus discharging the electrical energy stored in the stator coils. This action causes a change in stator polarity which produces a "braking" effect, thus slowing the rotation of the impeller very quickly.

In a specific embodiment, this invention provides an electronic system for controlling a fan motor. The electronic system includes a drive circuit connected to a first voltage source to provide a drive current to one or more stator coils thus producing rotation of the rotor of the fan motor. The drive current is provided to the stator coils in accordance with a first control signal that is applied to the drive circuit. A microcontroller, powered by the first voltage source is configured to produce the first control signal and to monitor the voltage level of the first voltage source. In accordance with the present invention, a second voltage source stores an amount of energy and is coupled to the microcontroller in order to provide power to the microcontroller when the voltage level of the first voltage source falls below a predetermined level. The energy stored in the second power source is sufficient to operate the microcontroller long enough to control the drive circuit to discharge energy stored in the stator coils thereby ceasing rotation of the rotor. For example, the present invention can stop the rotor in a matter of a few seconds or less. In one embodiment of the present invention, the drive circuit is a H-bridge circuit comprising at four electronic switching elements; e.g., each switching element can comprise one or more MOSFET devices. In another embodiment, the drive circuit is a half bridge circuit comprising two electronic switching elements.

The present invention provides a method of braking a fan motor. The method includes providing power from a first voltage source to a microcontroller. The method further includes providing drive current via the first voltage source to the stator coil(s) of a fan motor to operate the motor (i.e., make the rotor spin) by operating the microcontroller, thereby controlling a drive circuit to provide the drive current the stator coil(s). The method further includes storing electrical charge in a second voltage source. The method further includes monitoring the level of the first voltage level, and if the voltage level of the first voltage source falls below a predetermined level, then providing the energy stored in the second power source to operate the microcontroller for a period of time. The duration of this period of time is sufficient to allow the microcontroller to control the drive circuit to at least cause a discharge of the energy that is stored in the stator coils to thereby brake rotation of the rotor of the fan motor.

Many benefits can be achieved by the disclosed embodiments of the present invention. Embodiments of the invention provide an intelligent electronic system for controlling speed of a fan motor. The electronic system utilizes a microcontroller for monitoring input voltage from main power supply or detecting any external control signal for generating speed control or braking signals for the fan motor. The electronic system also utilizes a MOS transistor drive circuit to provide DC drive current to the stator coils of the fan motor. At a normal operation condition, the microcontroller is able to monitor the rotation of a rotor of the fan motor via a built-in Hall sensor, thereby providing stable speed control for the fan motor.

In certain abnormal situations when either a low input voltage condition is detected or a specific external signal requiring the fan motor to stop is received by the microcontroller, the MOS transistor drive circuit is able to stop the fan motor in a very short amount of time. For example, prototype devices constructed in accordance with the present invention have shown that the rotor can be stopped in a matter of a few seconds or less; actual times depend on the size of the fan blades and other factors such as angular momentum.

BRIEF DESCRIPTION OF THE DRAWINGS

FIG. 4 is an exemplary software code based on the flow chart in FIG. 3.

DETAILED DESCRIPTION OF THE INVENTION

Figure 1:
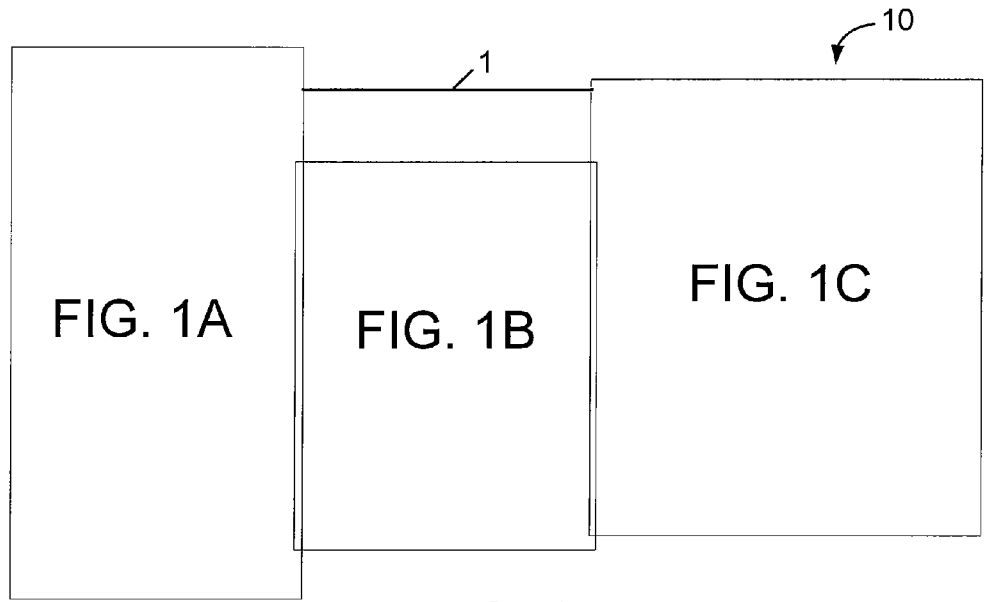
FIG. 1 is a schematic block diagram of an electronic system, divided into three sections, using a microcontroller for controlling a fan motor according to an embodiment of the present invention.

FIG. 1 is a schematic block diagram of an electronic system 10 using a microcontroller 200 for controlling a fan motor according to an embodiment of the present invention. This diagram is merely an illustrative example of electronic circuitry comprising the electronic system 10 according to the present invention which should not unduly limit the scope of the claims herein. One of ordinary skill in the art would recognize many variations, alternatives, and modifications. As shown, the electronic system 10 includes an H-bridge circuit 100 coupled to an input/output and power conditioning circuitry and a general purpose microcontroller 200 for intelligently driving or braking a fan motor M according to an embodiment of the invention. In the specific embodiment shown in FIG. 1, the microcontroller is manufactured and sold by Microchip Technology, Inc., part number PIC16F684. As for the H-bridge circuit 100, it would be understood by one of ordinary skill in the relevant motor arts that the terminals W1, W2 of the H-bridge circuit connect to terminals of the fan motor M to supply current to the stator coils of the fan motor. Due to the amount of detail in the circuit diagram, the diagram of FIG. 1 is divided into three sections and respectively designated as FIG. 1A, FIG. 1B, and FIG. 1C.

Figure 1A:
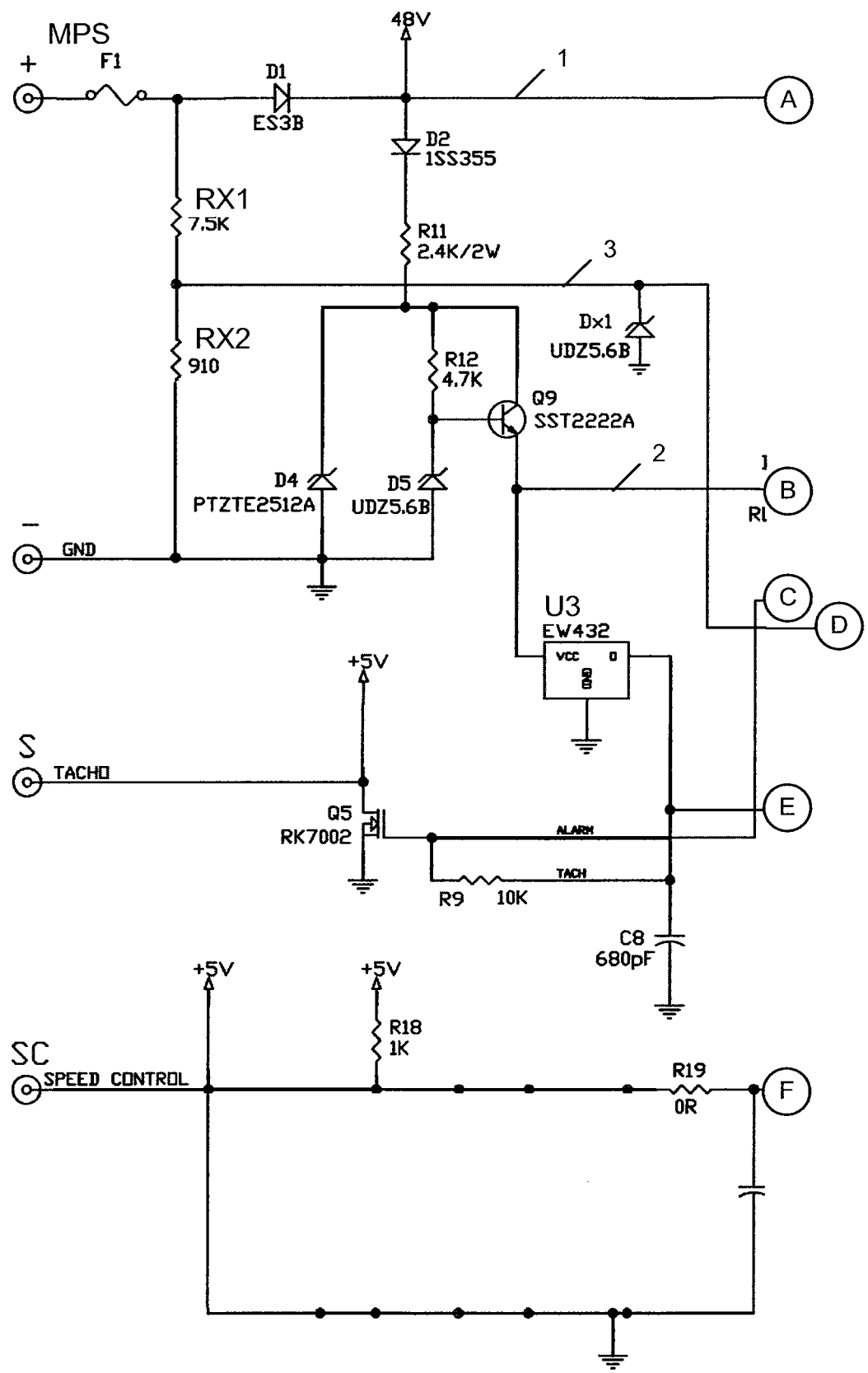
FIG. 1A is a schematic block diagram showing input/output and power conditioning circuitry of an electronic system for controlling a fan motor in FIG. 1.

FIG. 1A illustrates a portion of the schematic block diagram of FIG. 1 showing the input/output and power conditioning circuitry which receives power from a main power supply (MPS) and provides to the rest of the electronic system 10. The input/output and power conditioning circuitry includes a MPS terminal for delivering power to a drive circuit via a connection 1 and supplies a nominal input voltage level of 48 V which is typical for such systems. The circuitry further includes a voltage divider (R11, R12) connected across the MPS terminal and a ground terminal (GND). The voltage divider (R11, R12) provides an operating voltage level to the microcontroller 200 via a connection 2, and in the specific embodiment shown in FIG. 1A the connection 2 is made to pin #1 (see FIG. 1B) of the microcontroller 200. Another voltage divider (Rx1, Rx2) connected across the MPS terminal and the ground terminal GND supplies a lower voltage level to the microcontroller 200 via a connection 3, and in the specific embodiment shown in FIG. 1A the connection 3 is made to pin #3 (see FIG. 1B) of the microcontroller 200. As will be discussed further below, this allows the microcontroller 200 to monitor the level of the power supply MPS.

As shown in FIG. 1A, the input/output and power conditioning circuitry also includes a Hall sensor element U3 for detect change state of a rotor duty cycle, which will be discussed in more detail below. In the specific embodiment shown in the figure, the Hall sensor is a part manufactured and sold by Asahi Kasei EMD Corporation under part number EW432.

FIG. 1A also shows that the input/output and power conditioning circuitry includes an output terminal (TACHO) for providing a tachometer signal indicative of the speed of the fan motor. Interface circuitry (Q5, R89, and C8) couples an output of the Hall sensor U3 to the output terminal TACHO. It will be appreciated that the tachometer signal can be processed by a computer external to the electronic system 10 to produce a human-user readable display (e.g., displaying the speed in terms of rotations per second, RPM).

FIG. 1A further shows that the input/output and power conditioning circuitry includes an input terminal (SPEED CONTROL) which allows an external device, such as a computer, to input a speed control signal to the microcontroller 200 to control the fan speed. The interface circuitry (R18, R19, C20) couples the externally provided speed control signal to pin #10 of the microcontroller 200.

Figure 1B:
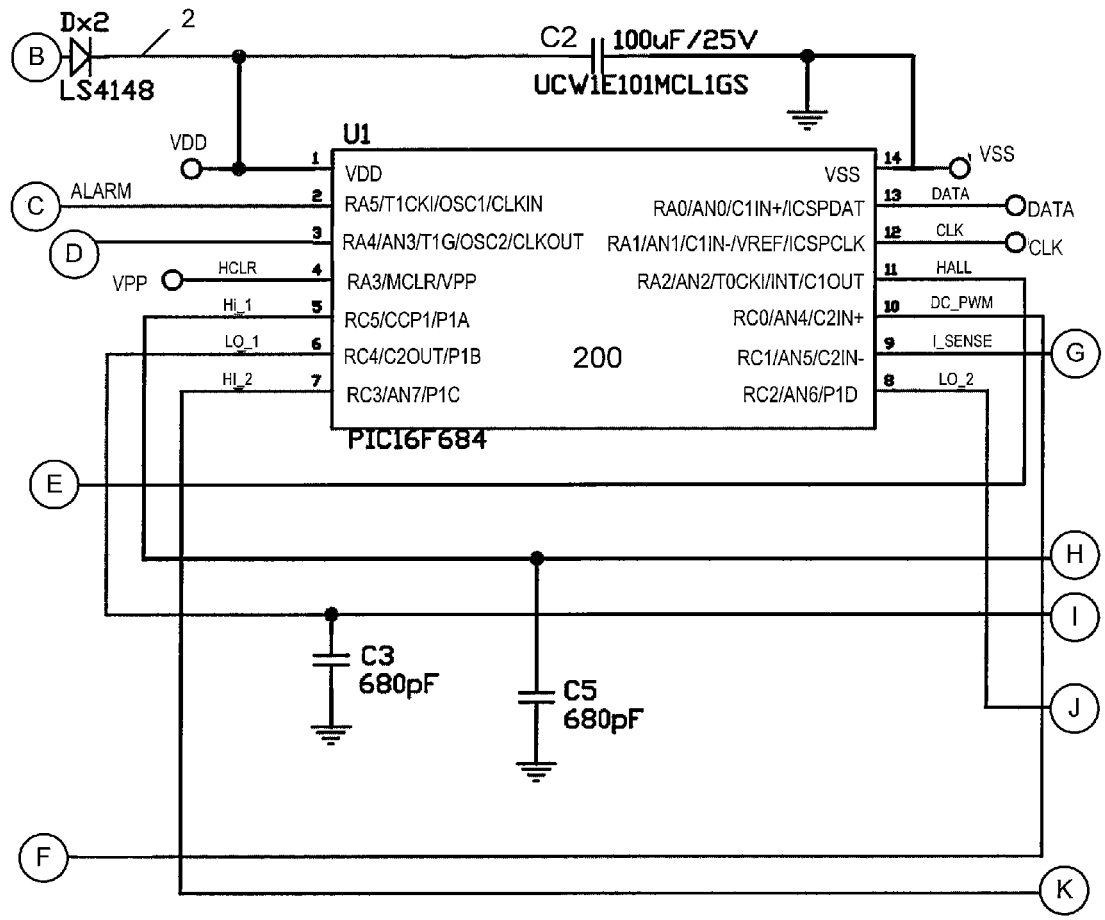
FIG. 1B is a schematic block diagram showing a microcontroller of an electronic system for controlling a fan motor in FIG. 1.

FIG. 1B is a schematic block diagram showing the microcontroller 200 of the electronic system 10 of FIG. 1. Also shown is a capacitor C2 coupled to connection 2 and across pins 1 and 14 of the microcontroller 200. The capacitor C2 functions as an energy store by storing electric charge received from the MPS via connection 2. As will be explained below, the capacitor C2, by virtue of it being coupled across pins 1 and 14, serves as a secondary voltage source for the microcontroller 200. The output of the Hall sensor U3 (FIG. 1A) is provided to the microcontroller 200 via pin #11.

Figure 1C:
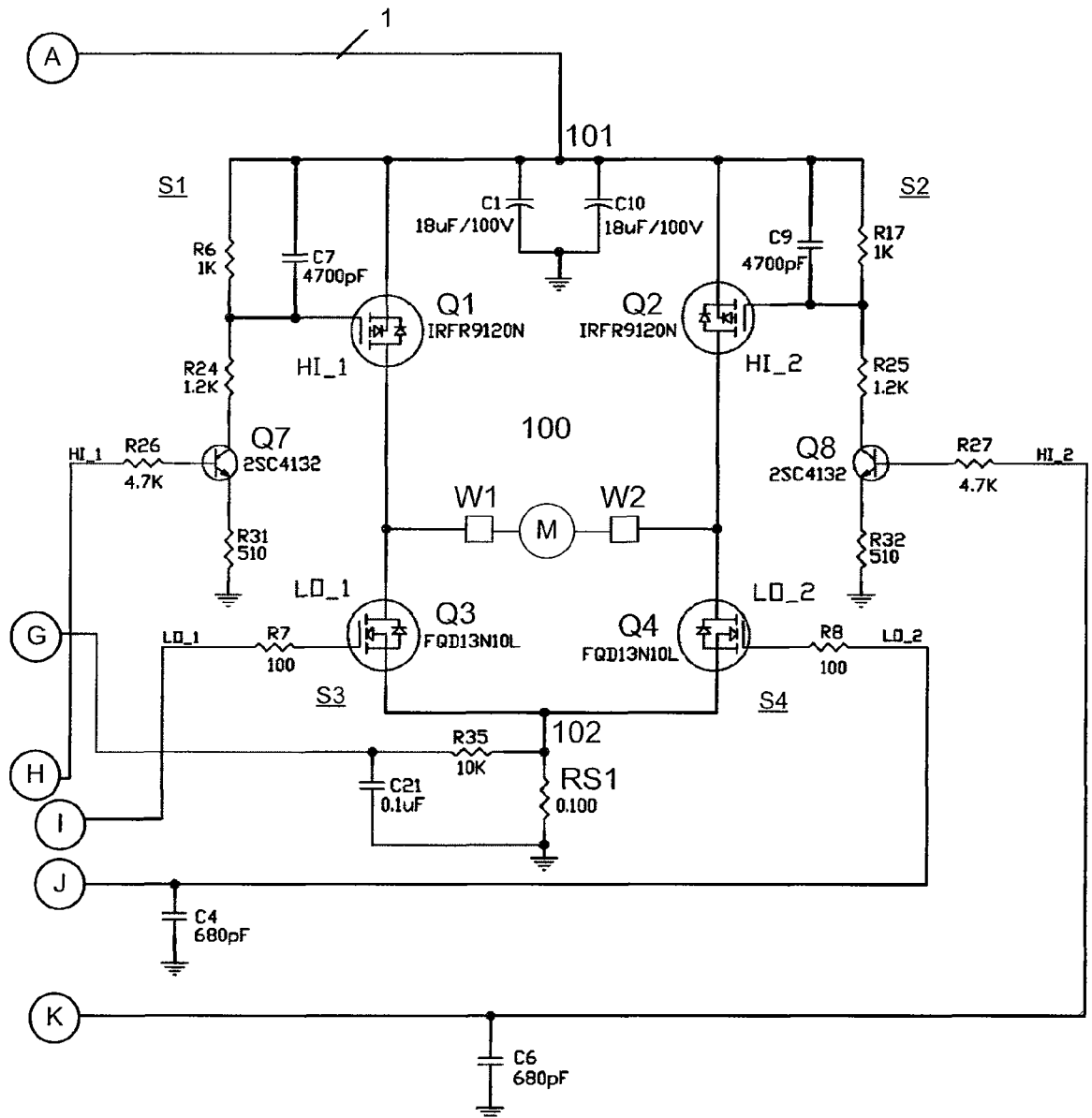
FIG. 1C is a schematic block diagram showing a drive circuit of an electronic system for controlling a fan motor in FIG. 1.

FIG. 1C is a schematic block diagram showing details of the drive circuit 100 of the electronic system 10 for controlling a fan motor M in FIG. 1. The drive circuit 100 is generally configured to receive control signals (commutation signals) from the microcontroller 200 to provide current (drive current) to the stator coils of the motor. In an embodiment of the present invention, the drive circuit 100 shown is an H-bridge circuit, and the particular configuration shown in FIG. 1C is commonly known as a "full" H-bridge. In this particular embodiment of the present invention, the motor is of the type commonly referred to as a brushless DC motor. Such fan motors are well known and thus do not require any additional detailed explanation and are not explicitly shown for the purposes of illustrating the present invention. The H-bridge circuit 100 shown in the figure is configured for driving a single-phase brushless DC motor and includes several electronic switching elements, discussed in further detail below, arranged to provide drive current to drive the stator coils of a single-phase brushless DC motor. Of course, it will be apparent that other embodiments of the present invention can be provided for controlling of other types of fan motors.

When power from the main power supply (MPS) is no longer available to the electronic circuit 10 and to the motor M—whether intentionally by someone switching off the power or as a result of some other interruption of power—the energy that is stored in the capacitor C2 as described above will be provided to the microcontroller 200. The amount of energy from the capacitor C2 should be sufficient to operate the microcontroller 200 long enough that it can generate control signals to control the drive circuit 100 for a period of time (on the order of one second or less). Control signals can therefore be transmitted to the H-bridge circuit 100 to change operation of the drive circuit 100 from a driving configuration into a braking configuration in accordance with the present invention, to stop the fan motor quickly.

Referring to FIG. 1C, the drive circuit 100 in one embodiment is shown to be the H-bridge circuit. The drive circuit 100 is configured with four electronic switches S1-S4. In the particular embodiment shown in the figure, the first, second, third, and fourth switches S1-S4, comprise transistor devices Q1-Q4, respectively, along with auxiliary components such as resistors (e.g., R8, R7) and so on. In the particular embodiment shown, the transistor devices Q1-Q4 are commonly known MOSFET devices. It is noted that the term "switch" is sometimes used to refer to transistor devices. However, for the purposes of the present invention, the term "switch" includes the transistor device (the primary component of the "switch") and any additional component which might be needed to allow the transistor devices to be operated in accordance with the present invention, e.g., a biasing resistor and so on. Depending on the particular implementation, the term "switch" and the term "transistor device" might refer to the same electronic element.

In particular, the transistor devices Q1 and Q2, each, has a terminal that couples to a circuit end terminal 101. Likewise, the transistor devices Q3 and Q4, each, has a terminal that couples to another circuit end terminal 102. As shown in FIG. 1, the end terminal 101 is connected to receive power from the main power supply (MPS) via the connection 1. The main power supply MPS provides the drive current to drive the stator coils of the motor M via the H-bridge circuit 100. Switches S1 and S2 are sometimes referred to as the high-voltage sides of the H-bridge circuit 100.

The end terminal 102 is connected to electrical ground. The third switch S3 and the fourth switch S4 are sometimes referred as being the low-voltage sides of the H-bridge circuit 100. An interface circuit (RS1, R35, C21) can be disposed between the end terminal 102 and the electrical ground to provide a monitoring signal for the microcontroller 200. In particular embodiment shown, the monitoring signal is fed into pin #9 of the microcontroller 200. The H-bridge circuit 100 further includes two middle terminals W1 and W2 for connection to the motor M. The terminal W1 is connected to terminals of the transistor devices Q1 and Q3. The terminal W2 is connected to terminals of the transistor devices Q2 and Q4.

In the particular embodiment shown in FIGS. 1B and 1C, transistor devices Q1 and Q2 are PMOS devices and transistor devices Q3 and Q4 NMOS devices. The gate terminals of transistor devices Q3 and Q4 are respectively connected to output pins #6 and #8 of the microcontroller 200. The source terminals of the transistor devices Q3 and Q4 are commonly connected to the end terminal 102 of the H-bridge circuit 100, which in turn are electrically grounded. The drain terminals of transistor devices Q3 and Q4 are respectively connected to terminals W1, W2. Similarly, the drain terminals of transistor devices Q1 and Q2 are respectively connected to terminals W1, W2. The source terminals of transistor devices Q1 and Q2 are commonly connected to end terminal 101, which in turn is connected to receive power from the power supply MPS. The gate terminals of transistor devices Q1 and Q2 are respectively controlled by transistors Q7 and Q8, the operation of which is discussed below. It will be appreciated that transistor devices Q1 and Q2 can be NMOS devices and transistor devices Q3 and Q4 can be PMOS devices with appropriate alterations to the other components of the H-bridge circuit 100 to properly bias the transistor devices.

Referring to FIGS. 1, 1A, and 1B, the H-bridge circuit 100 can control the switches S1-S4 to operate in a driving configuration or a braking configuration. In the driving configuration, the main power supply MPS gives a high potential to the end terminal 101 and an input pin #3 of the microcontroller 200 via connection 2 (i.e., this pin monitors and detects the input voltage from MPS is above a preset potential level). The microcontroller 200 then is able to draw power via the connection 2 from the MPS through pin #1. At the same time, the capacitor C2 is being charged through connection 2 during normal operation (namely, in the driving configuration). In this case, the microcontroller 200 is configure to send a control signal to the H-bridge circuit 100 to turn ON and OFF the switches S1-S4 in the following cross configuration manner: at one time Q1 and Q4 are ON to allow current to flow across the stator coil in the direction from W1 to W2, and on alternate times Q2 and Q4 are ON to allow current to flow across the stator coil of the motor M in the direction from W2 to W1. The switching of the direction of current flow is commonly known by those of ordinary skill as "commutation." The period of time curing which the current is flowing in a given direction is commonly known by those of ordinary skill as a "commutation cycle."

Additionally, the microcontroller 200 couples a Hall sensor U3 to monitor the rotation of the magnet rotor of the motor M. Because the rotor is a permanent magnet, its rotation is detected by the Hall sensor U3 as the alternating poles of the permanent magnet rotor rotate past the Hall sensor. The microcontroller 200 receives signals from the Hall sensor U3 indicative of the passage of the different poles, and turns ON and OFF the switches S1-S4 in the manner described above to cause rotation of the rotor. Operation of DC brushless motor is a very well understood process. Operation of the microcontroller 200 used in the present invention is fully described in commonly assigned U.S. Pat. No. 6,725,132 which is herein incorporated fully by reference for all purposes.

For example in one specific half duty cycle, the microcontroller 200 uses pin #6 to generate an electrical signal with a voltage at logic-low level to a gate of NMOSFET Q3 and uses pin #7 to generate another electrical signal with a voltage at logic-high level to a base of a bipolar PNP transistor Q8. NMOSFET Q3 is off due to a low gate voltage. Q8 thus is turned on (between its emitter and collector) due to pulling a small current at its base. Correspondingly, the transistor device Q2 (a PMOSFET) is turned off due to a less negative voltage level than a channel threshold voltage of Q2. Within the same implementation and after a brief time delay, the microcontroller 200 uses pin #5 to send an electrical signal with a voltage at logic-high level which causes a high base current relative to an emitter of another PNP bipolar transistor Q7 and uses pin #8 to send another electrical signal with a voltage at logic-high level. Q7 thus is turned off, correspondingly giving a negative voltage level at a gate terminal of the PMOSFET Q1 bigger than a channel threshold voltage. Then the transistor device Q1 is turned on to allow current flowing from end terminal 101 to middle terminal W1. At the same time, high voltage level at the gate terminal of NMOSFET Q4 turns off the switch to allow the current loop complete from W1 through the stator coils to the end terminal 102.

In certain embodiments, the PNP bipolar transistor Q7 or Q8 can be replaced by an internal DC-DC power supply (not shown) which can be configured to receive output signal from the microcontroller 200 and generate or transfer one or more voltage signals for controlling the on/off states of the corresponding MOSFET Q1 or Q2. Of course, there can be many variations, alternatives, and modifications. As mentioned above, a more detail description about using microcontroller to intelligently control operations of one or more cooling fans can be found in U.S. Pat. No. 6,725,132.

Under abnormal conditions, for example, when the main power supply is powered off, or when then power supply fails, or for some other reason where the input voltage level of MPS falls below a preset threshold ($V_t$), such change in the voltage level is detected by the microcontroller 200 by virtue of its connection to pin #3. In accordance with the present invention, the value $V_t$ is a value of the voltage level below which the microcontroller 200 cannot properly operate. As will be explained below, when the microcontroller 200 detects the drop in input voltage, the microcontroller will operate in what is referred to as the braking condition.

Referring to FIG. 1A and FIG. 1B, recall that capacitor C2 is continually charged during normal (driving condition) operation of the motor M; i.e., the voltage level of the power supply MPS is above the preset threshold, $V_t$. Thus, when the input voltage of MPS falls below $V_t$, the microcontroller 200 will remained powered for a brief period of time as the stored energy in capacitor C2 discharges in the microcontroller. In the particular embodiment disclosed, for example, $V_t$ is based on the sum of the voltage level of the fully charged C2 and potential difference of protection diode Dx2 in front of C2. For example, referring to FIG. 1, the capacitor C2 is a 100µF capacitor with a 25V rating. Assuming the main power supply is a 48 VDC standard, the microcontroller 200 can maintain its operation using the amount of energy stored in the capacitor C2 for period of time. Depending on the capacitance (here it is 100µF), the period of time can be about a few seconds.

The input voltage of the power supply is monitored at pin #3 of the microcontroller 200 via voltage divider circuit (Rx1 and Rx2). The voltage divider circuit first divides down the input voltage into a representative voltage. When a power off situation occurs (i.e., whether intentionally or unexpectedly such as failure of the power supply), the input voltage quickly drops and so does the representative voltage that is sensed by the microcontroller 200. The sensed voltage value is first converted to a digital signal by an analog-to-digital (A/D) converter internal to the microcontroller 200. The converted digital signal is compared with a preset threshold to determine where the input voltage stands. If the converted digital signal is determined to be smaller than the preset threshold $V_t$, suggesting the input voltage (from MPS) is lower than a predetermined value, this can trigger execution of a plurality of preloaded control program inside the microcontroller 200 to generate one or more control signals to the drive circuit 100. For example, the typical input voltage of the power supply MPS is 12 volts, 24 volts, or 48 volts. The present threshold $V_t$ would be set accordingly. For example, for 48 volts, the preset threshold $V_t$ might be set to a value (depending on the divider circuit) that corresponds to a predetermined minimum allowed value 24 volts for the input voltage. Depending on the drive circuit configuration and specific transistor switch types used, the microcontroller 200 of FIG. 1B is capable of generating a second control signal for braking the H-bridge circuit 100 in FIG. 1C. The second control signal sets proper voltage signals at low or high levels at certain pins, including pins #5 and #7 or pins #6 and #8.

In the particular disclosed embodiment of the present invention, referring to FIG. 1B and FIG. 1C, the microcontroller 200 outputs a low level voltage signal on pins #5 and #7 which causes two PMOSFET transistor devices Q1 and Q2 on high-voltage sides of the H-bridge circuit 100 to be turned off. The microcontroller 200 also outputs a high level voltage signal to pins #6 and #8 which causes two NMOSFET transistor devices Q3 and Q4 on low-voltage sides to be turned on, directly shorting the middle terminals W1 and W2 to an electrical ground via terminal 102 and resistor RS1. The result of this action causes the inductive energy stored within the stator coils of motor M to be released or discharged by shorting the two middle terminals W1 and W2 to electrical ground, therefore quickly impeding the rotor's normal rotation, or effectively braking the fan motor. Typically, the above discharging process occurs within a short period of time. For example, the short period of time is less than a few seconds. Of course, there can be many alternatives, variations, and modifications in the voltage signal strength and relative levels depending on the applications.

In an alternative embodiment, the microcontroller 200 can be configured to receive an external signal for stopping the fan motor. The external signal may be inputted through the same pin #3 or through a separate pin. The microcontroller 200 can be configured to respond to the external signal, either with or without the input voltage monitoring. In other words, the microcontroller 200 is able to trigger an operation for stopping the fan motor no matter whether the main power supply MPS is in normal or abnormal situation. For example, at a special system maintenance event, in order for the operator to access the region of the fan motor, such an external signal can be sent to the microcontroller to specifically shut down the impeller blade of that particular fan. In certain systems, a backup cooling for that region may be provided during this period for maintaining the system cooling requirement.

Figure 2:
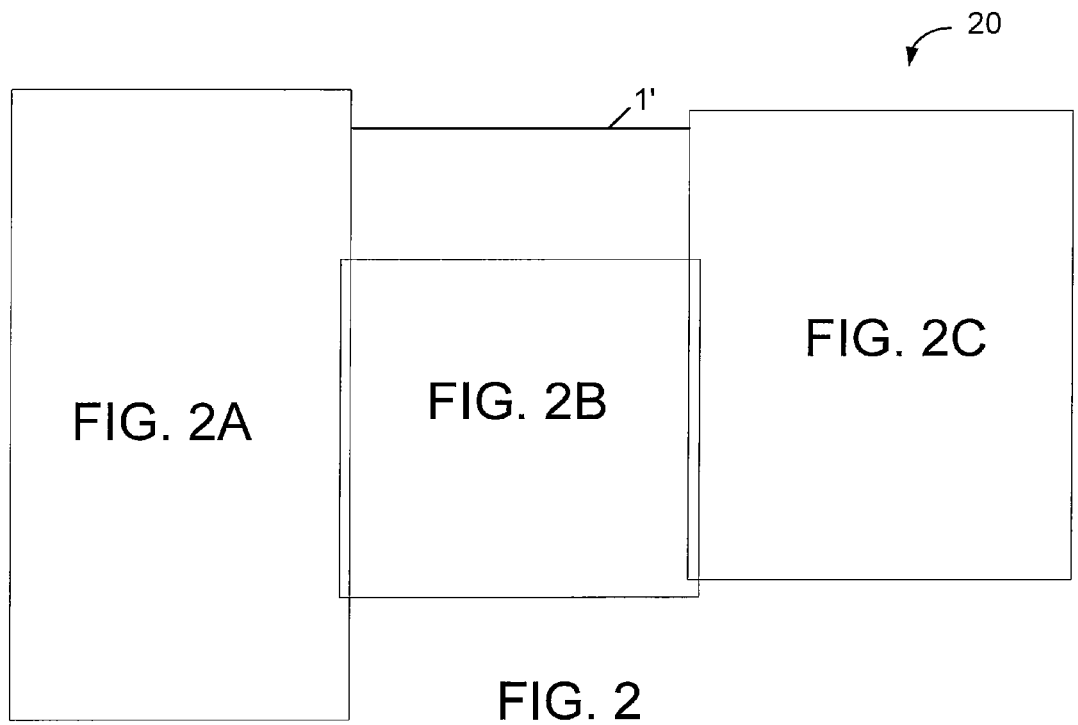
FIG. 2 is a schematic block diagram of an electronic system, divided into three sections, using a microcontroller for controlling a fan motor according to another embodiment of the present invention.
Figure 2A:
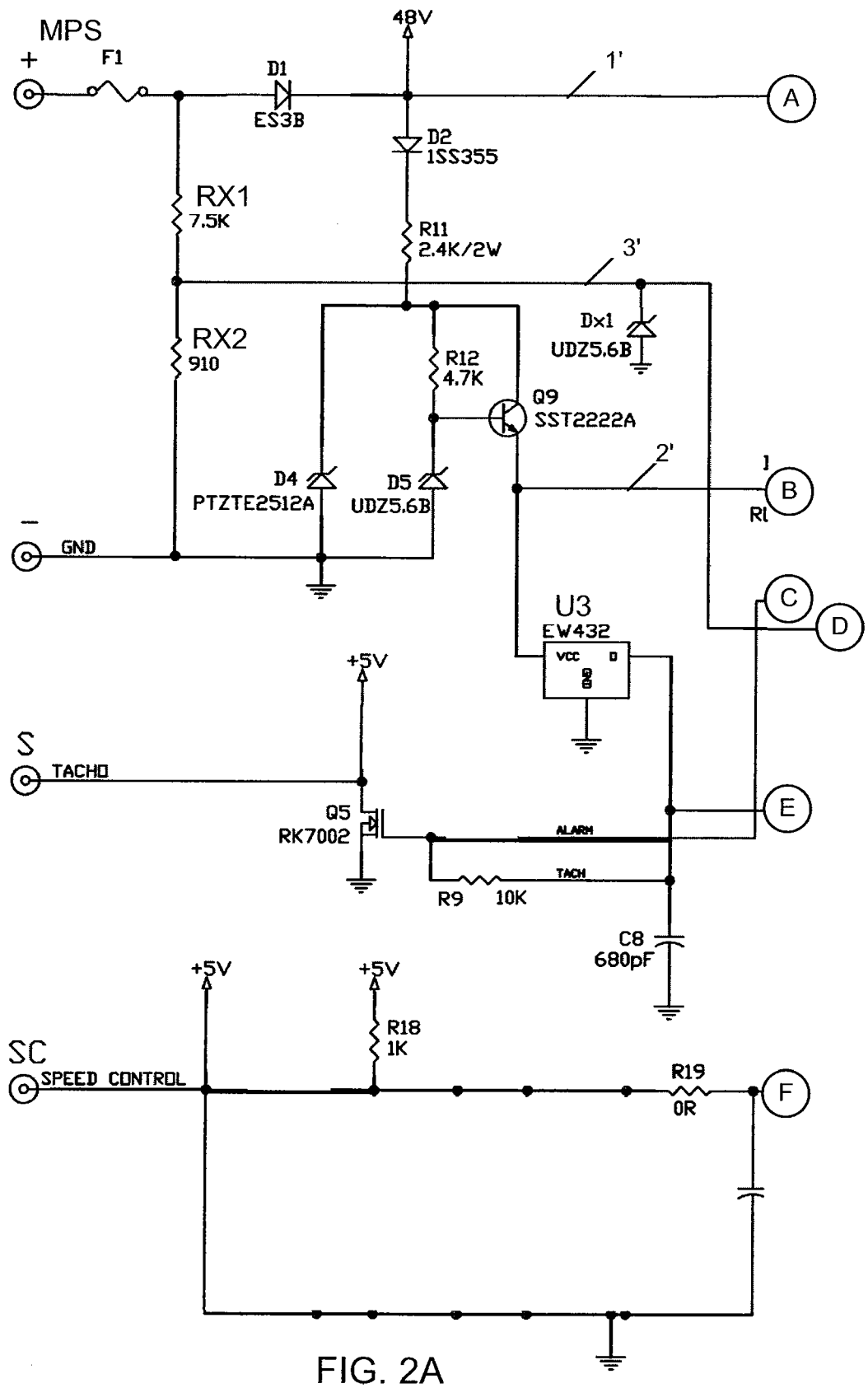
FIG. 2A is a schematic block diagram showing a power supply circuit of an electronic system for controlling a fan motor in FIG. 2.
Figure 2B:
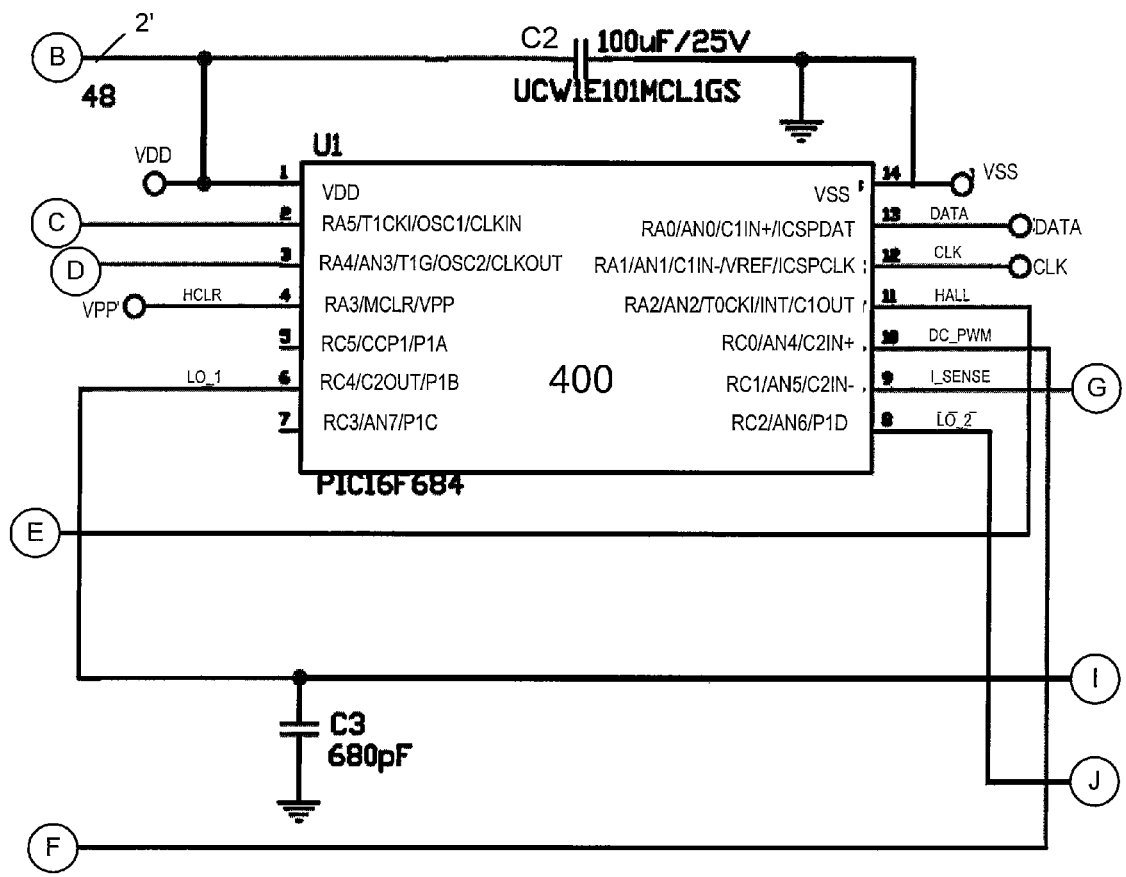
FIG. 2B is a schematic block diagram showing a microcontroller of an electronic system for controlling a fan motor in FIG. 2.
Figure 2C:
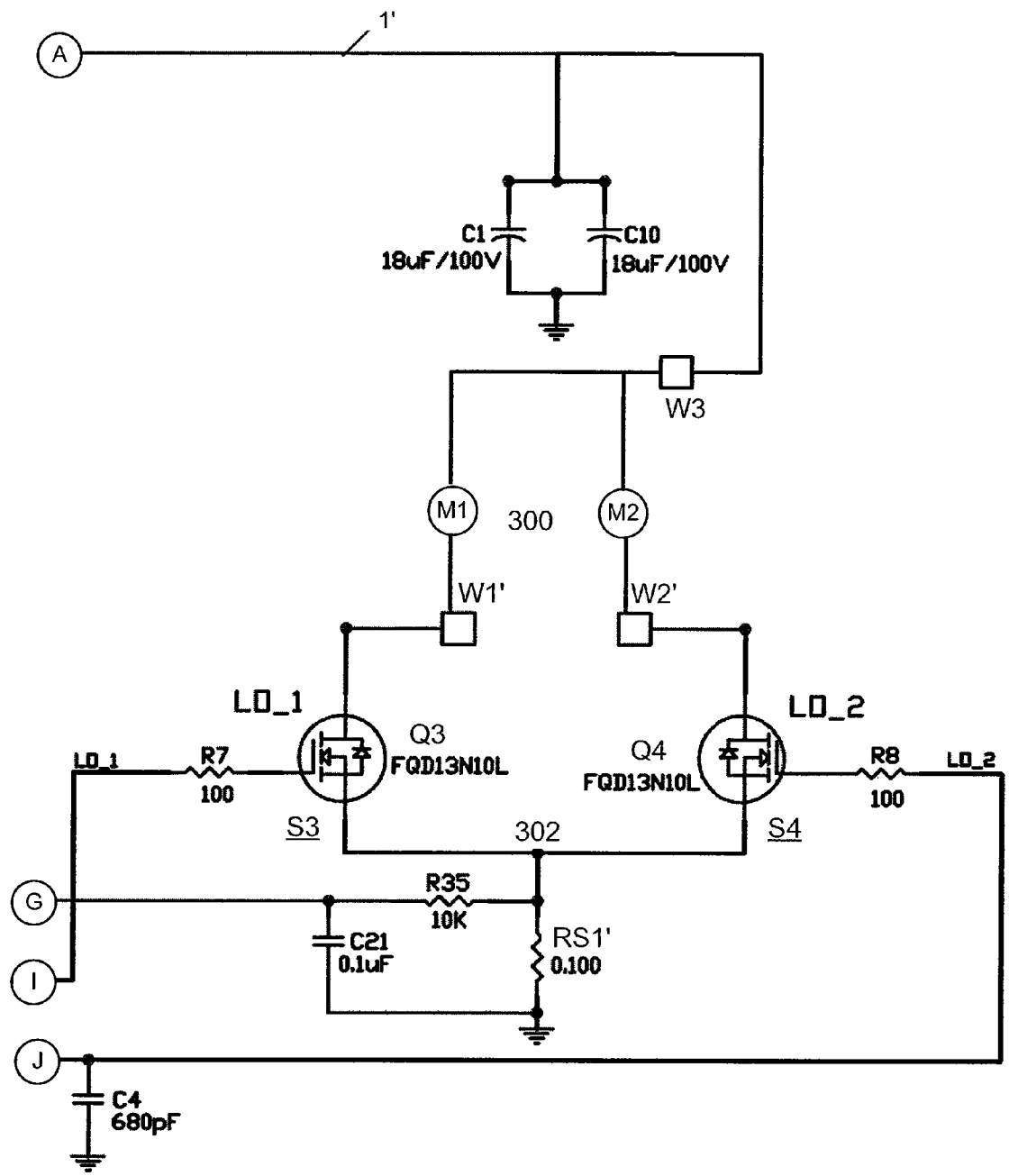
FIG. 2C is a schematic block diagram showing a drive circuit of an electronic system for controlling a fan motor in FIG. 2.

FIG. 2 is a schematic block diagram of an electronic system using a microcontroller for controlling a fan motor according to another embodiment of the present invention. This diagram is merely an example, which should not unduly limit the scope of the claims herein. One of ordinary skill in the art would recognize many variations, alternatives, and modifications. For illustration purpose, this diagram is divided into three sections, named respectively as FIG. 2A, FIG. 2B, and FIG. 2C. FIG. 2A is a schematic block diagram showing a power supply circuit of an electronic system for controlling a fan motor in FIG. 2. FIG. 2A is substantially the same as FIG. 1A. FIG. 2B is a schematic block diagram showing a microcontroller 400 of an electronic system for controlling a fan motor in FIG. 2. FIG. 2B is substantially the same as FIG. 1B. FIG. 2C is a schematic block diagram showing a drive circuit of an electronic system for controlling a fan motor in FIG. 2. As shown in this implementation, the drive circuit 300 is a half bridge circuit. In this implementation, the fan motor to be controlled comprises at least two sets of stator coils, a first stator coil M1 and a second stator coil M2, wound in opposite directions relative to each other. Each of the two sets of stator coils M1 or M2 of the fan motor allows current to pass at just one half of duty cycle of the rotor. As shown, the drive circuit 300 also includes a first switch S3 configured to couple to a first stator coil M1 of the motor in series between an end terminal W3 and a middle terminal W1' and a second switch S4 configured to couple to a second stator coil M2 in series between the end terminal W3 and another middle terminal W2'. The first switch S3 and the second switch S4 is commonly connected to a circuit end terminal 302 which is connected to electrical ground. The end terminal W3 is a terminal that couples to the main power supply via a connection 1' for providing drive current to the first stator coil M1 and the second stator coil M2 alternatively.

In one embodiment, each of the two switches S3 and S4 comprises a MOSFET transistor device (respectively Q3 and Q4) with a gate terminal respectively coupled to a separate pin of a microcontroller 400 to receive one or more control signals. For example, the one or more control signals include a first control signal that causes the drive circuit 300 to turn on one of the transistor devices Q3 and Q4 to achieve a desired control of drive current passing through either the first stator coil or the second stator coil within certain half duty cycle of the rotor. In one embodiment, both Q3 and Q4 are PMOSFET transistor devices. In another embodiment, both Q3 and Q4 are NMOSFET transistor devices. In yet another embodiment, the transistor devices can be either PMOSFET or NMOSFET or simply called a FET device (field-effect transistor device).

In a normal operation condition, the microcontroller 400 is configured to draw power from the MPS via a connection 2' and send the first control signal to respectively turn on switch S3 and turn off switch S4 or vise versa, which allow the drive current passing through the first stator coil M1 from W3 to W1'. Within a period of time, both switches S3 and S4 stay in their ON/OFF states until the rotation of the rotor causes a change in state of duty cycle which can be detected by a Hall sensor U3 (Shown in FIG. 2A) coupled with the microcontroller 400. Then, U3 induces the microcontroller 400 to generate another control signal to respectively turn off switch S3 and turn on switch S4 to allow the drive current passing through the second stator coil M2 from W3 to W2'. In other words, the microcontroller 400 is able to process a sensing signal from the Hall sensor U3 to determine how switches S3 and S4 should be controlled to interact with the rotor so that the proper synchronized control signal can be generated to control the rotation speed of the rotor.

In an abnormal condition, for example, when the main power supply is removed or has failed for some reason, the voltage level at connection 2' drops and at the same time the microcontroller 400, which monitors the input voltage through a voltage divider via connection 3', is able to determine whether a voltage level received by pin #3 falls lower than a preset threshold. Referring to FIG. 2A and FIG. 2B, the capacitor C2, which is coupled to the main power supply (MPS) in series via a connection 2' and is fully charged to store an amount of energy depending on its rating. The capacitor C2 is also coupled to the microcontroller 400 in parallel. As long as the potential level drops below the sum of the charged potential and a potential difference of a protection diode Dx2 located in front of C2, the capacitor C2 is able to release its stored energy to the power input pin #1 of the microcontroller 400. With the amount of energy released from the capacitor C2, the microcontroller 400 can sustain its function for additional period of time to generate a plurality of control signals (depending on the microcontroller's processor speed and power rating). The additional period of time is about a few seconds depending on the rating of the capacitor C2 and coupling with the microcontroller 400.

When the pin #3 of the microcontroller 400 detects a voltage signal lower than the preset threshold, the microcontroller can trigger an embedded software code for generate one or more control signals in response to the abnormal condition. Referring to FIGS. 2B and 2C, at least, the microcontroller 400 is able to send a second control signal to the drive circuit 300 that can turn on both switches S3 and S4. In this case, both the first stator coil M1 and the second stator coil M2 through either switch S3 or S4 are now shorted to electrical ground. The inductive energy stored within each of the first stator coil M1 and the second stator coil M2 can be quickly released or discharged to the electrical ground, causing a cessation of rotation of the rotor of the fan motor. Typically, the above discharging process occurs within a short period of time. For example, the short period of time is less than a few seconds. Referring to FIG. 2, a small resistor RS1 is connected between the end circuit terminal 302 and the ground so that a monitoring voltage signal can be retrieved by the microcontroller 400.

Figure 3:
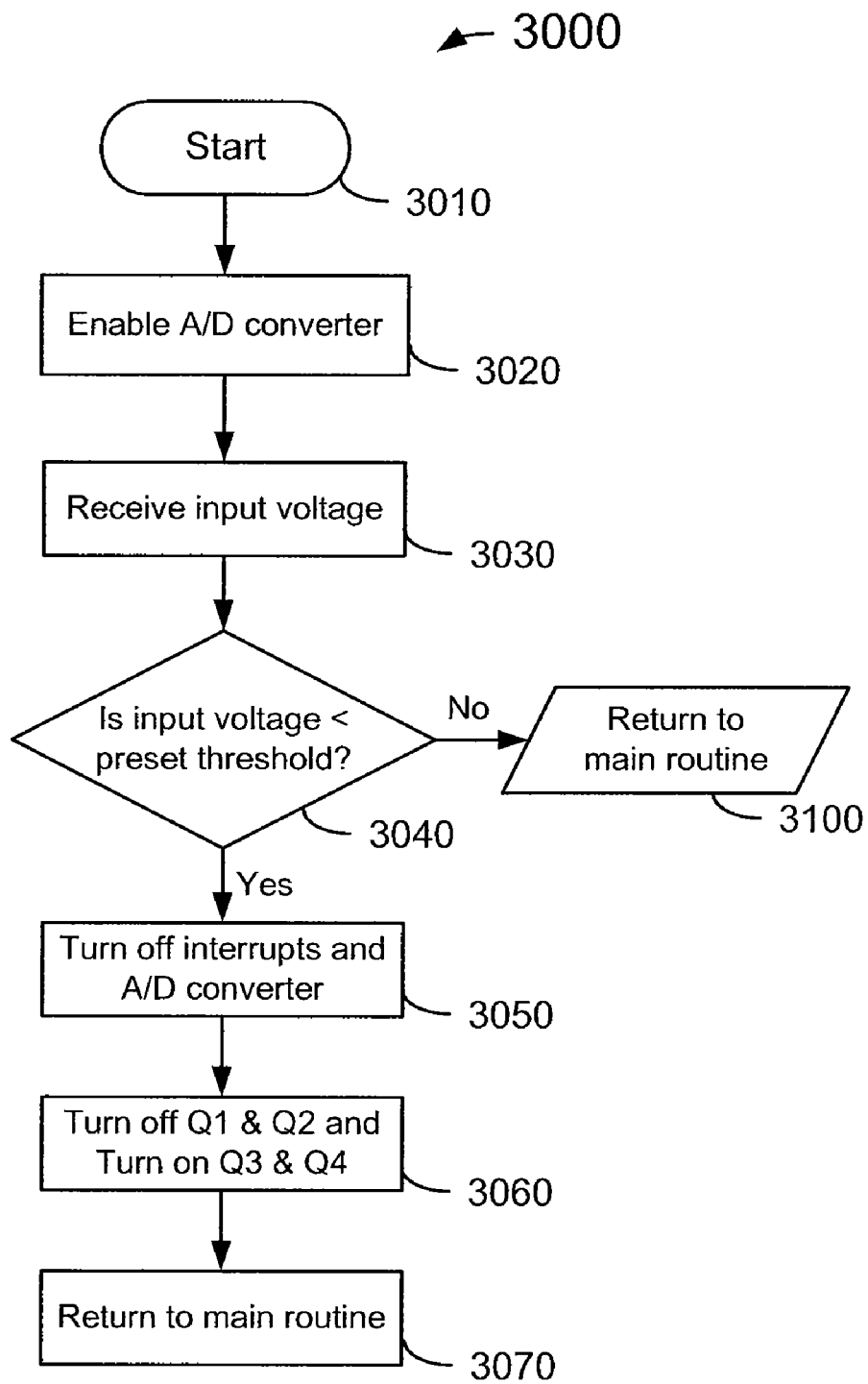
FIG. 3 is a simplified flow chart illustrating a sub-routine for braking the fan motor according to an embodiment of the present invention.

FIG. 3 is a simplified flow chart illustrating a sub-routine for braking the fan motor according to an embodiment of the present invention. This diagram is merely an example, which should not unduly limit the scope of the claims herein. One of ordinary skill in the art would recognize many variations, alternatives, and modifications. As explained above, a microcontroller is used in an electronic system for controlling the fan motor. The microcontroller can be configured to execute a control program which is stored in a computer readable media and pre-loaded therein. A subroutine of the control program can be summarized by the flow chart of FIG. 3 as a method for braking a fan motor using voltage checking. FIG. 4 is an illustrative segment code of the voltage checking subroutine of the control program starting with command #1001. In particular, the method starts at step 3020 with a process of enabling an analog-to-digital (A/D) converter inside the microcontroller (command #1010) and a digital channel (e.g., channel 3) is selected for receiving the signal associated with the input voltage from the power supply. The channel 3 may correspond to pin #3 of the microcontroller 200 or 400. Following that, the routine executes code (step 3030) for waiting a required A/D acquisition time (command #1030) and starts the A/D conversion (command #1040). While the analog input voltage is coming in, the microcontroller is waiting for conversion to complete (command #1050).

Then, a voltage checking process (step 3040) in terms of digital signal comparison after the acquisition and conversion processes is executed by software code from command #1070 to command #1110. In particular, if the above software code calculation shows that the input voltage has not dropped below the preset threshold, then the routing is led back to the main control routine (step 3100). If the above software code calculation shows that the input voltage does dropped below the preset threshold, then additional software code will be executed from command #1120 and on.

Firstly, at step 3050 the code turns off or disables a global interrupt enable (GIE) bit associated with the microcontroller digital channels to prevent unwanted computing interrupts. For example, in normal operation one interrupt may occur if there is a state change detected on pin 11 by Hall sensor U3. Once this occurs, the software code is executed specific to that event. Now since GIE is set to zero by command #1130, all interrupts are disabled.

Secondly, at step 3060 the code turns off the A/D converter to save power (as the main power supply has been removed, energy released from the capacitor C2 available for the microcontroller is limited). This is done by setting parameter ADON to zero by command #1140 form the original value set by command #1010. In one embodiment, these two commands are illustrated by a process of turning off interrupts and A/D converter after the input voltage is determined to be lower than a preset threshold, as shown in FIG. 3.

Thirdly, at step 3070 the code starts to execute writing into PORTC parameter with the value of 014h by command #1150. In binary, this is equivalent to a value of 00010100. This causes the following outputs substantially at the same time: Pin 10 (RC0)=low; Pin 9 (RC1)=low; Pin 8 (RC2)=high; Pin 7 (RC3)=low; Pin 6 (RC4)=high; Pin 5 (RC5)=low. Referring back to FIG. 1, when pins #5 and #7 are at low logic levels, the MOS transistors Q1 and Q2 are turned off. While the pins #6 and #8 are at high logic levels, the MOS transistors Q3 and Q4 are turned on. Thus, the two ends of stator coil, which is configured to be connected between terminals W1 and W2 (see FIG. 1), are shorting to ground to have a same potential, effectively impeding the rotor or braking the fan motor. In FIG. 3, this process is illustrated by a step of turning off transistors Q1 and Q2 and turning on transistors Q3 and Q4.

Subsequently, the software code will execute commands #1160 and #1170 to turn off pulse width modulation (PWM) that is provided on each output (pins 5-8) going to the H-bridge circuit. When the built-in PWM generator in the microcontroller is disabled by setting both variables CCPR1L and CCP1CON to zero, the two lower branch switches, i.e., MOS transistors Q3 and Q4 will be kept on and the two upper branch switches MOS transistors Q1 and Q2 will be kept off. In one embodiment, any duty cycle is not applied to these pins after the execution of the commands #1160 and #1170.

In certain embodiment, the microcontroller may still have energy left after the completion of the above software code execution. The routine thus can be led back to the main control program, step 3070. In other words, the microcontroller is capable of generating one or more control signals depending on applications and built-in processor speed. For example, the same microcontroller may send a control signal that will be directed to a separate H-bridge circuit for operating a separate fan motor or one of a series of fan motors. The control signal may instruct to stop the separate fan motor or to do anything else. In another embodiment, the microcontroller may perform a processing of an external signal not related to the input voltage from the main power supply, the external signal can still instruct the microcontroller to send a control signal to stop the fan motor in a desired manner.

As pointed out earlier, the FIGS. 3 and 4 are examples of one embodiment of the present invention. In fact, they are merely referred to the electronic system with H-bridge circuit for braking the fan motor using a microcontroller shown in FIG. 1. Or course, there can be many alternatives, variations, and modifications. For example, the electronic system shown in FIG. 2 can be used, though the microcontroller may have substantially similar functions excepting some pins are now open. In other examples, some additional elements can be added so that an external signal can be sent to the microcontroller, or a connector/splitter module can be added between the microcontroller and a plurality of fan motors for further utilizing or expanding the control functions of the microcontroller described above.

Many benefits can be achieved by embodiments of the present invention. Certain embodiments of the invention provide a simple addition of an intelligent electronic system for controlling speed of one or more fan motors. The electronic system utilizes a microcontroller for monitoring input voltage from main power supply or detecting any external control signal for generating speed control or fan braking signals. The electronic system also utilizes MOS transistor circuit to provide DC power to the stator coil of the fan. At normal operation condition, the microcontroller is able to monitor the change of magnetic rotor duty cycle via a built-in Hall sensor, thereby providing stable speed control for the fan. In abnormal situations when either a low input voltage is detected or a specific external signal requiring the fan to stop is received by the microcontroller, the MOS transistor circuit is able to stop the fan in a few seconds by responding to the control signals sent from the microcontroller. Some embodiments of the present invention uses the same microcontroller for providing control of a plurality of fans, including capability of specifically braking a specific one of the plurality of fans and generating multiple operation instructions for one or more fan motors as desired. Comparing to a conventional system for passively braking a fan motor, embodiments of the present invention provides intelligence to the operation of cooling fans in accordance with the increasing complexities in modern computer systems or telecommunication systems.

It is also understood that the examples and embodiments described herein are for illustrative purposes only and that various modifications or changes in light thereof will be suggested to persons skilled in the art and are to be included within the spirit and purview of this application and scope of the applied claims.

What is claimed is:

1. An electronic system for controlling a fan motor, the electronic system comprising:
a drive circuit connected to a first voltage source via a first connection to provide a drive current to one or more stator coils of the fan motor for causing rotation of a rotor of the fan motor, the drive current being provided to the stator coils in accordance with first control signals;
a microcontroller connected to the first voltage source via a second connection to receive power therefrom, the microcontroller connected to the drive circuit being configured to produce the first control signals to the drive circuit and to monitor a voltage level of the first voltage source via a third connection; and
a second voltage source connected to the first voltage source and having stored therein an amount of energy, the second voltage source being coupled to the microcontroller to provide power thereto when the voltage level of the first voltage source is smaller than a predetermined level, the amount of energy being sufficient to operate the microcontroller for a period of time to produce second control signals to the drive circuit, wherein the drive circuit discharges energy stored in the one or more stator coils to an electrical ground in accordance with the second control signal thereby causing cessation of rotation of the rotor of the fan motor.

2. The electronic system of claim 1 wherein the drive circuit is a full H-bridge circuit having a first switch and a second switch on a high-voltage side of the H-bridge circuit and a third switch and a fourth switch on a low-voltage side of the H-bridge circuit.

3. The electronic system of claim 2 wherein the first switch is on a side opposite to the fourth witch and the second switch is on a side opposite to the third switch, the high-voltage side is connected to the first connection and the low-voltage side connected to the electrical ground.

4. The electronic system of claim 2 wherein the H-bridge circuit further has two middle terminals configured for connection to the stator coils, the two middle terminals being respectively shared by the two high-voltage side and by the low-voltage side.

5. The electronic system of claim 2 wherein each of the third switch and the fourth switch comprises a MOS transistor device, each MOS transistor device having a gate configured to be controlled by control signals from the microcontroller, the control signals turning on/off said each MOS transistor device.

6. The electronic system of claim 2 wherein each of the first switch and the second switch comprises a MOS transistor device, each MOS transistor device having a gate configured to be controlled by control signals from the microcontroller, the control signals effecting a turning on and turning off of said each MOS transistor device.

7. The electronic system of claim 1 wherein the first control signals cause the drive current to pass from the first connection through the one or more stator coils in one direction or opposite depending on one half of duty cycle of the rotor.

8. The electronic system of claim 1 wherein the second control signal at least turns on both the third switch and the fourth switch to discharge the energy stored in the stator coils to an electrical ground and turns off both the first switch and the second switch substantially at same time to block a charge back-flow into the first connection.

9. The electronic system of claim 1 wherein the drive circuit is a half bridge circuit having a first common terminal connected to the first connection and a third switch and a fourth switch on two low-voltage sides having a second common terminal connecting to the electrical ground.

10. The electronic system of claim 9 wherein the half bridge circuit further has two middle terminals respectively connected to one of the two low-voltage sides, each of the two middle terminals being configured to respectively connect to one of at least two stator coils wound in opposite directions within the fan motor to allow current passing in one stator coil at one half of duty cycle of the rotor and in another stator coil at another half of duty cycle of the rotor.

11. The electronic system of claim 1 wherein the first voltage source is a DC power supply with a nominal voltage level of about 48 V and the predetermined level is about 24 V.

12. The electronic system of claim 1 wherein the second voltage source is a capacitor.

13. The electronic system of claim 1 wherein the period of time is a few seconds or less.

14. The electronic system of claim 1 further comprising a Hall sensor to determine a change state from one half of duty cycle to another half of duty cycle of the rotor.

15. The electronic system of claim 1 wherein the microcontroller is further configured to process an external instruction for generating a control signal to the drive circuit.

16. A method of braking a fan motor, the method comprising:
providing a drive current to one or more stator coils of the fan motor, the drive current being provided to the one or more stator coils in accordance with a commutation control signal to cause rotation of a rotor of the fan motor;
storing electrical energy from a first voltage source to an energy storage device;
operating a microcontroller to generate the commutation control signal, the microcontroller receiving electrical energy from the first voltage source;
operating the microcontroller to monitor a voltage level of the first voltage source;
when the voltage level of the first voltage source falls below the predetermined level:
providing electrical energy from the energy storage device to the microcontroller; and
producing a second control signal to control the drive circuit to discharge energy stored in the one or more stator coils to an electrical ground thereby braking rotation of the rotor of the fan motor.

17. The method of claim 16 wherein the drive circuit is a full H-bridge circuit having a first FET switch and a second FET switch to provide the drive current from the first voltage source to the one or more stator coils, the full H-bridge circuit further having a third FET switch and a fourth FET switch to provide an electrical path from the one or more stator coils to ground potential.

18. The method of claim 17 wherein the commutation control signal turns ON and OFF a first pair of switches and a second pair of switches in alternating fashion, each of the first and second pair of switches comprising the first FET or second FET switches and the third FET or fourth FET switches.

19. The method of claim 17 wherein the second control signal turns OFF the first and second switches and turns ON the third and fourth switches, thereby discharging the energy stored in the one or more stator coils.

20. The method of claim 17 wherein the first and second FET switches are on a high-voltage side of the H-bridge circuit and the third and fourth FET switches are on a low-voltage side of the H-bridge circuit.

21. The method of claim 16 wherein the drive circuit is a half bridge circuit having a first common terminal configured to connect the first voltage source to the one or more stator coils and further having a first FET switch and a second FET switch to provide the one or more stator coils with an electrical path to electrical ground.

22. The method of claim 21 wherein the second control signal turns ON both the third FET switch and the fourth FET switch, thereby discharging the energy stored in the one or more stator coils.

23. The method of claim 16 wherein the second voltage source is a capacitor.

24. The method of claim 16 further comprising receiving an external signal, wherein the microcontroller produces the second control signal in response to receiving the external signal.

* * * * *